Patented Mar. 26, 1935

1,995,911

UNITED STATES PATENT OFFICE 1,995,911

METHOD OF MAKING ARTIFICIAL FUEL

John Wysocki and William R. Rich, Baltimore, Md., assignors to U. S. Industrial Alcohol Co., New York, N. Y., a corporation of West Virginia No Drawing. Application February 7, 1933, Serial No. 655,622

5 Claims. (Cl. 44—7)

This invention relates to the class of artificial fuels consisting principally of alcohol with a small amount of nitrocellulose and some water. These fuels have heretofore been of a solid nature. The general procedure has been to prepare an alcoholic collodion and to inject into this either aqueous alcohol or water, producing coagulation. In one process dilute alcohol was introduced through multitudinous fine tubes so as to create a tubulous mass, each of the entering streams of alcohol being immediately surrounded by a tubule of precipitated nitro-cotton, through the walls of which the surrounding collodion was gelled. The finished product made in this way contained a large amount of free liquid, the balance representing a gross cellular structure and gel.

In the most commercially successful process of making solid alcohol, water is injected through the collodion to the bottom of the receptacle. In this case a tubular or cellular structure is formed from the bottom up to about one-half the depth, the upper half consisting principally of gel. The volume of free liquid in the product made in this way is less than with the other process.

Such solid fuels may be cut into blocks, but for the most part they are prepared in the cans in which they are sold.

An object of the invention is to provide a fuel which is a flowable, uniform gel. A further object is to provide a flowable gel fuel which does not separate an undue amount of liquid. A still further object is to provide a flowable fuel jelly which will not spread freely over a surface on which it may be burned.

Our fuel may be packaged in large or small cans, an advantage which it then possesses being that portions of it can be readily removed from the can for use in chafing-dishes or otherwise.

A particular object of the invention, however, is to provide a fuel which can be packaged in collapsible tubes, from which portions of the fuel can be expelled until the tube is empty.

Former fuels were not adapted for putting up in this form. They could not very readily be made in long narrow containers, and, if made outside, the solid material could not be satisfactorily packed into tubes. Aside from these difficulties, however, they could not be dispensed from collapsible tubes, since pressure applied to the tube would expel practically only free liquid through the small nozzle, the solid or densely precipitated structure remaining behind, choking the outlet and holding back the gel.

A further object is to produce a fuel which is originally a viscous product and which will remain or can be kept in that condition for a suitable length of time, so that it can be filled into the tubes or other containers.

In a brief description, the process is to prepare or provide an alcoholic collodion or base solution, and to add to this, very gradually, alcohol containing a small proportion of water, all the while keeping the mass well agitated. In order to produce the desired type of flowable gel and also to prevent undue development of free liquid later, careful adjustment is made of the rate at which the aqueous alcohol is added in relation to the rate at which it is distributed throughout the mass. After this aqueous alcohol is incorporated, there is then added a further quantity of the base nitrocellulose solution, usually about one-half of the amount initially used, the mixture being well agitated meanwhile to obtain a homogeneous mixture of all the component parts. When the mixing is complete and the product allowed to stand, it will then set to form a flowable gel of the type described. The time required for this setting will vary depending on the nitro-cotton used, also to some extent on the proportions of the constituents, and finally on the temperature at which it is held. The setting can be hastened materially by holding at elevated temperatures, say from 90°–100° F. Not only is precipitation in the ordinary sense avoided, but presumably the particles of this gel are exceedingly fine, since little or none of the liquid is squeezed out after gelling.

It is a product which is difficult to obtain with these materials unless the factors and conditions of the operation are carefully coordinated. The base solution is very sensitive to the aqueous alcohol which is added, and the limits between the formation of the desired gel and partial, or irregular, precipitation are rather narrow. For this reason, strong agitation is required to give rapid and uniform distribution of the diluting liquid, and this water-carrying alcohol should be introduced no faster than it is distributed. This can be accomplished by flowing the alcohol in through a sufficiently small orifice or orifices, with or without valve regulation.

With the materials at favorable temperatures, a proper strength of the diluting alcohol, and the rate of flow of the diluting alcohol synchronized with the rate of distribution, a uniform product can be obtained at any season of the year.

The following example will illustrate the process:

An 8% nitrocellulose solution is prepared from:

143 parts of nitrocellulose wet with 30% denatured alcohol equivalent to 100 parts of dry nitrocellulose of a type the solubility rate of which in this solvent mixture is very slow at room temperature.
100 parts of methanol.
1090 parts of absolute ethyl alcohol, preferably containing wood alcohol as denaturant.

1333 parts.

With reference to the use of nitrocellulose wet with 30% denatured alcohol, it may be explained that this is a matter of convenience, nitrocellulose in this form being an article of commerce. In this particular formula absolute alcohol is used in order to avoid having an undue amount of water in the collodion, but this is not essential. Proportions of the constituents, and the specific alcohol or alcohols employed, may be varied.

The material is dissolved by agitation. This may be accomplished at ordinary temperatures, or it may be hastened by cooling during the process of dissolving. It is important that the nitrocotton be thoroughly dissolved or dispersed in the solvent medium before proceeding to the next step.

The entire procedure is then as follows: Take 390 parts of the base solution, which should be brought to room temperature if cooling has been resorted to for dissolving the nitrocellulose, and put this into a vessel equipped with an agitator. Then 210 parts of 88.5% ethyl alcohol, preferably containing wood alcohol as denaturant, is run slowly into the base solution while vigorous agitation is maintained, always keeping the distribution equal to or ahead of the addition, as previously explained. The agitation is preferably continued for about fifteen minutes after all the diluting alcohol has been added and the temperature has been raised to above 90° F. Next, 200 parts of the base solution are added with the agitation continued, while a temperature of about 90° F. is maintained, for about half an hour after the addition is complete.

The process thus provides a bulk flowable product suitable for filling into collapsible tubes or other containers, in which it will form the clear, flowable gel constituting the final product.

The concentration of the base solution, the concentration of the diluting alcohol, the temperatures, the rate of addition and the rate of distribution may be varied if, with much of a change in one factor, appropriate changes are made in others.

Our experience indicates that there is a limit to the amount of water that can be incorporated in this fuel and that the limit is considerably lower than in the case of solid alcohols made from similar ingredients. It appears that the amount should be less than about 10% of the final product, and that, on the other hand, it should be above 2%.

It will be understood that the most advantageous proportion of water will depend upon the rate of solubility of the nitrocellulose that is employed in the solvent mixture that is employed. With the type of nitrocellulose specified in the example, namely one the solubility rate of which, at room temperature, in the solvent mixture (or in absolute ethyl alcohol denatured in the customary manner with wood alcohol) is very slow, we have found that a suitable proportion of water in the final product is around 3%–4%.

In this connection, we have ascertained that an especially satisfactory flowable gel fuel is obtained by following the procedure that has been described, when a nitrocellulose of this type is selected, rather than the type which is readily soluble in the solvent mixture or in denatured absolute alcohol.

On the other hand, it seems to be necessary to use more nitrocellulose in our flowable gel fuel than is required for solid alcohol. The percentage of nitrocellulose in the fuel may apparently be varied from about 2½% to 6%, with 4%–6% as the most practical range.

Methanol may be used in greater proportion to the ethyl alcohol in the base solution, or it may be used as the only alcohol present in this solution. Likewise a mixture of ethyl and methyl alcohols containing water, or aqueous methyl alcohol alone, may be used as the diluting alcohol. If methanol is used throughout, the gel obtained is apt to be opaque and does not hold its liquid quite as well, but it is flowable under pressure through small openings and collapsible tubes filled with it can be completely emptied.

As it is known that the acetone present in commercial methyl alcohol gives it much of its solvent power for nitrocellulose, ethyl alcohol and acetone may be used in the preparation of the base solution as has been done in the manufacture of solid alcohol.

We have found that by incorporating the water-carrying alcohol with a part of the total amount of alcoholic solution of nitrocellulose (more especially nitrocellulose of the type that has been described), while carefully adjusting the rate at which the aqueous alcohol is added to the rate at which it is dispersed in the mass by the agitation, and then adding the balance of the nitrocellulose in alcoholic solution, with thorough agitation, the final product will be substantially or entirely stable even under rather adverse conditions, such as long storage under summer heat or infrequent removal of portions of the contents of a tube, with long intervals of hot weather between squeezings. Another aspect of the improved process is that it makes it possible to use a variety of nitro-cottons and still obtain a flowable gel fuel that will keep satisfactorily.

It will naturally be understood that the alcoholic nitrocellulose solution to which the aqueous alcohol is added, and the alcoholic nitrocellulose solution which is subsequently added need not be identical, since as pointed out the precise composition of the base solution may be varied. For economy and convenience, it is an advantage to prepare and to use in two installments one base solution, but this is not essential.

We claim:

1. The process of producing an artificial fuel which comprises adding, gradually, to a portion of alcoholic solution of nitrocellulose, alcohol containing a small amount of water, while preventing any irregular coagulation by uniformly distributing the diluting liquid throughout the mixture at a rate so related to the rate of introduction that such coagulation does not occur, and then, under strong agitation, mixing in a further portion of alcoholic solution of nitrocellulose to form a homogeneous, viscous product, which sets to a stable, flowable gel.

2. The process of producing an artificial fuel which comprises adding, gradually, to a portion of alcoholic solution of nitrocellulose, alcohol containing a small amount of water, while preventing any irregular coagulation by uniformly distributing the diluting liquid throughout the mixture at a rate so related to the rate of introduction that such coagulation does not occur, the foregoing being conducted at relatively low temperature, then raising the temperature to about 90° F. and adding, under strong agitation, a further portion of alcoholic solution of nitrocellulose to form a homogeneous, viscous product, which sets to a stable, flowable gel.

3. The process of producing an artificial fuel which comprises adding, gradually, to a portion of alcoholic solution of nitrocellulose, alcohol containing a small amount of water, while preventing any irregular coagulation by uniformly distributing the diluting liquid throughout the mixture at a rate so related to the rate of introduction that such coagulation does not occur, and then, under strong agitation, mixing in a further portion of alcoholic solution of nitrocellulose to form a homogeneous, viscous product, which sets to a stable, flowable gel, the total amount of water which is incorporated in the fuel being less than 10% of the final product.

4. The process of producing an artificial fuel which comprises adding, gradually, to a portion of alcoholic solution of nitrocellulose, alcohol containing a small amount of water, while preventing any irregular coagulation by uniformly distributing the diluting liquid throughout the mixture at a rate so related to the rate of introduction that such coagulation does not occur, and then, under strong agitation, mixing in a further portion of alcoholic solution of nitrocellulose to form a homogeneous, viscous product, which sets to a stable, flowable gel, the total amount of water which is incorporated in the fuel being about 3%–4% of the final product.

5. The process of producing an artificial fuel which comprises adding, gradually, to a portion of alcoholic solution of nitrocellulose of the type the solubility of which, at room temperature, in absolute alcohol is very slow, alcohol containing a small amount of water, while preventing any irregular coagulation by uniformly distributing the diluting liquid throughout the mixture at a rate so related to the rate of introduction that such coagulation does not occur, and then, under strong agitation, mixing in a further portion of alcoholic solution of nitrocellulose to form a homogeneous, viscous product, which sets to a stable, flowable gel.

JOHN WYSOCKI.
WILLIAM R. RICH.